(12) United States Patent
Mohamadi et al.

(10) Patent No.: US 8,922,371 B2
(45) Date of Patent: Dec. 30, 2014

(54) DISTRIBUTED SENSORS FOR INTRUSION DETECTION

(75) Inventors: Farrokh Mohamadi, Irvine, CA (US); Mehran Mohktari, Thousand Oaks, CA (US); Mohsen Zolghadri, Irvine, CA (US)

(73) Assignee: TiaLinx, Inc., Newport Beach, CA (US)

( * ) Notice: Subject to any disclaimer, the term of this patent is extended or adjusted under 35 U.S.C. 154(b) by 223 days.

(21) Appl. No.: 13/157,185

(22) Filed: Jun. 9, 2011

(65) Prior Publication Data

US 2012/0313782 A1    Dec. 13, 2012

(51) Int. Cl.
| | |
|---|---|
| G08B 13/18 | (2006.01) |
| G01S 13/04 | (2006.01) |
| G01S 13/87 | (2006.01) |
| G08B 13/183 | (2006.01) |
| G01S 13/88 | (2006.01) |
| G01S 7/00 | (2006.01) |

(52) U.S. Cl.
CPC ............ *G08B 13/183* (2013.01); *G01S 13/04* (2013.01); *G01S 13/87* (2013.01); *G01S 13/886* (2013.01); *G01S 7/003* (2013.01)
USPC ............................................. 340/552; 342/27

(58) Field of Classification Search
USPC ............................... 340/552–554; 342/27–28
See application file for complete search history.

(56) References Cited

U.S. PATENT DOCUMENTS

| | | | |
|---|---|---|---|
| 2009/0256706 A1* | 10/2009 | Brown | 340/552 |
| 2010/0148961 A1* | 6/2010 | Raphaeli | 340/552 |
| 2011/0006897 A1* | 1/2011 | Micko | 340/565 |

* cited by examiner

*Primary Examiner* — Thomas Mullen
(74) *Attorney, Agent, or Firm* — Haynes and Boone, LLP

(57) ABSTRACT

An array of paired V-band sensors is provided to act as a virtual fence to detect human intrusion. Each sensor includes a rotating circuit board that includes an antenna array. The sensor pivots the circuit board with regard to a weight base to align with an opposing sensor. By alternatively transmitting and receiving with regard to the opposing sensor, a V-band bistatic radar system is enabled that detects human intrusion between the opposing sensors.

4 Claims, 6 Drawing Sheets

DISTRIBUTED SENSORS FOR INTRUSION DETECTION

TECHNICAL FIELD

This application relates to remote sensing, and more particularly to an array of distributed sensors for instruction detection.

BACKGROUND

Security concerns regarding national borders grow ever more urgent. Low-tech solutions such as fences are easily scaled and crossed by illegal aliens, terrorists, or other security threats. In contrast, millimeter-wave motion detectors provide a virtually secure and foolproof method of detecting intrusion by human beings. However, existing millimeter-wave-based sensors are expensive and cumbersome.

There is thus a need in the art for improved millimeter-wave sensors for intrusion detection.

SUMMARY

In accordance with a first embodiment, an intrusion sensor for detecting intrusion in a bi-static radar system is provided that includes: a weighted base, the base including a coil; a pivot attached to a the base; a circuit board mounted on the pivot; wherein the circuit board includes: a magnet; a rotation control circuit configured to control a rotation of the circuit board about the pivot through magnetic interaction with the magnet in response to driving a current into the coil; an antenna array; a transmit receive module for alternating transmitting and receiving a V-band signal through the antenna array, the transmit receive module being configured to integrate the received signal and to compare the integrated signal to a threshold to make an intrusion detection decision; and a radio circuit for reporting the intrusion detection signal to a user.

In accordance with another embodiment of the invention, a method of detecting an intrusion is provided that includes: providing an array of paired V-band sensors, arranged from a first pair to an last pair; in a first sensor in a given one of the pairs and an opposing second sensor in an adjacent pair, rotating a circuit board in each sensor to align a contained antenna array to transmit towards the opposing sensor; alternatively transmitting from the first sensor back to the second sensor and from the second sensor back to the first sensor using the aligned antenna arrays, wherein when one sensor transmits, the other sensor receives; during a receiving period, integrating the received signal and comparing the integrated signal to a threshold; and if the integrated signal exceeds a threshold, raising an alarm by transmitting through a separate radio link to a user.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
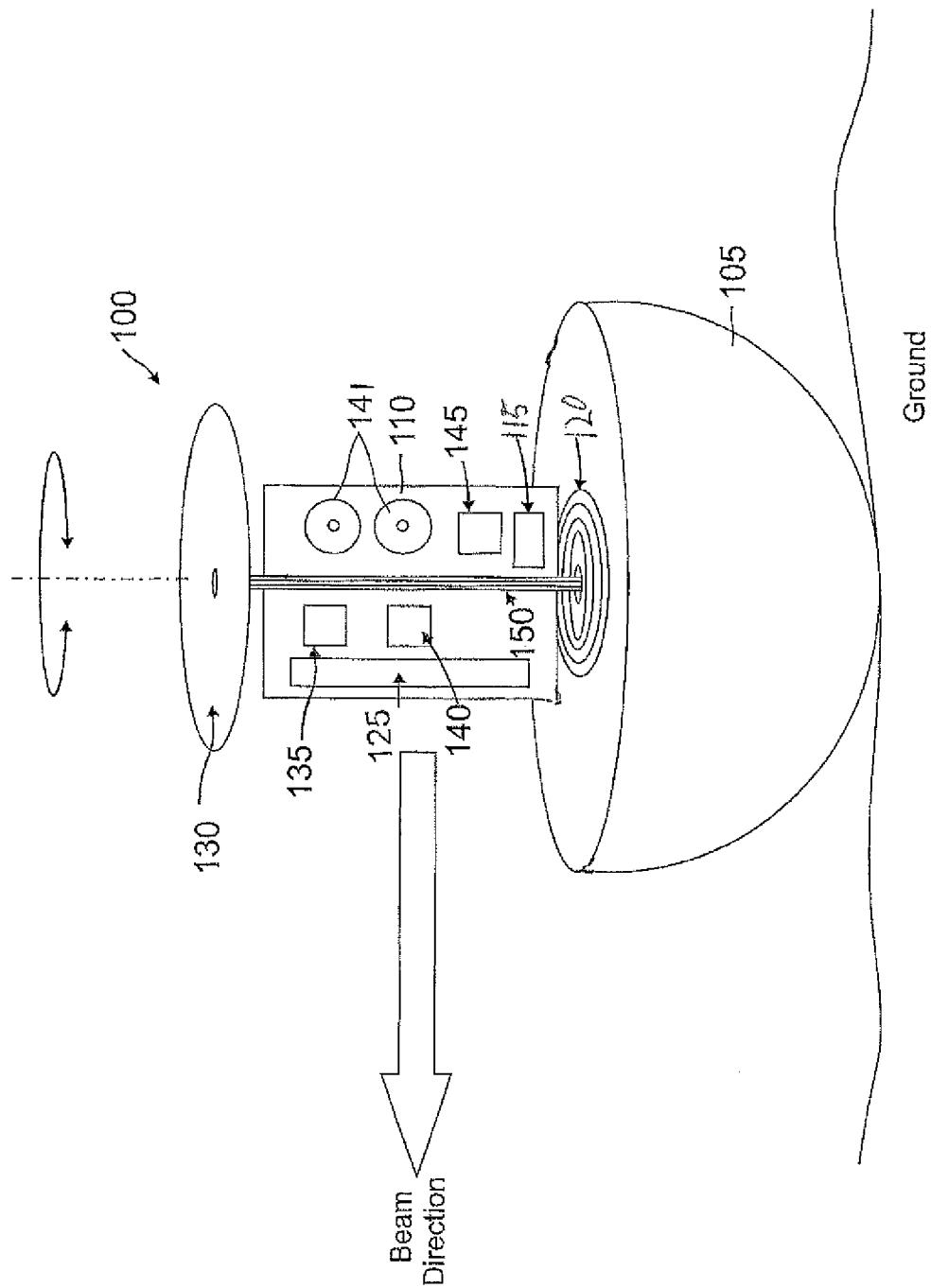
FIG. 1 is a block diagram for an intrusion sensor.
Figure 2:
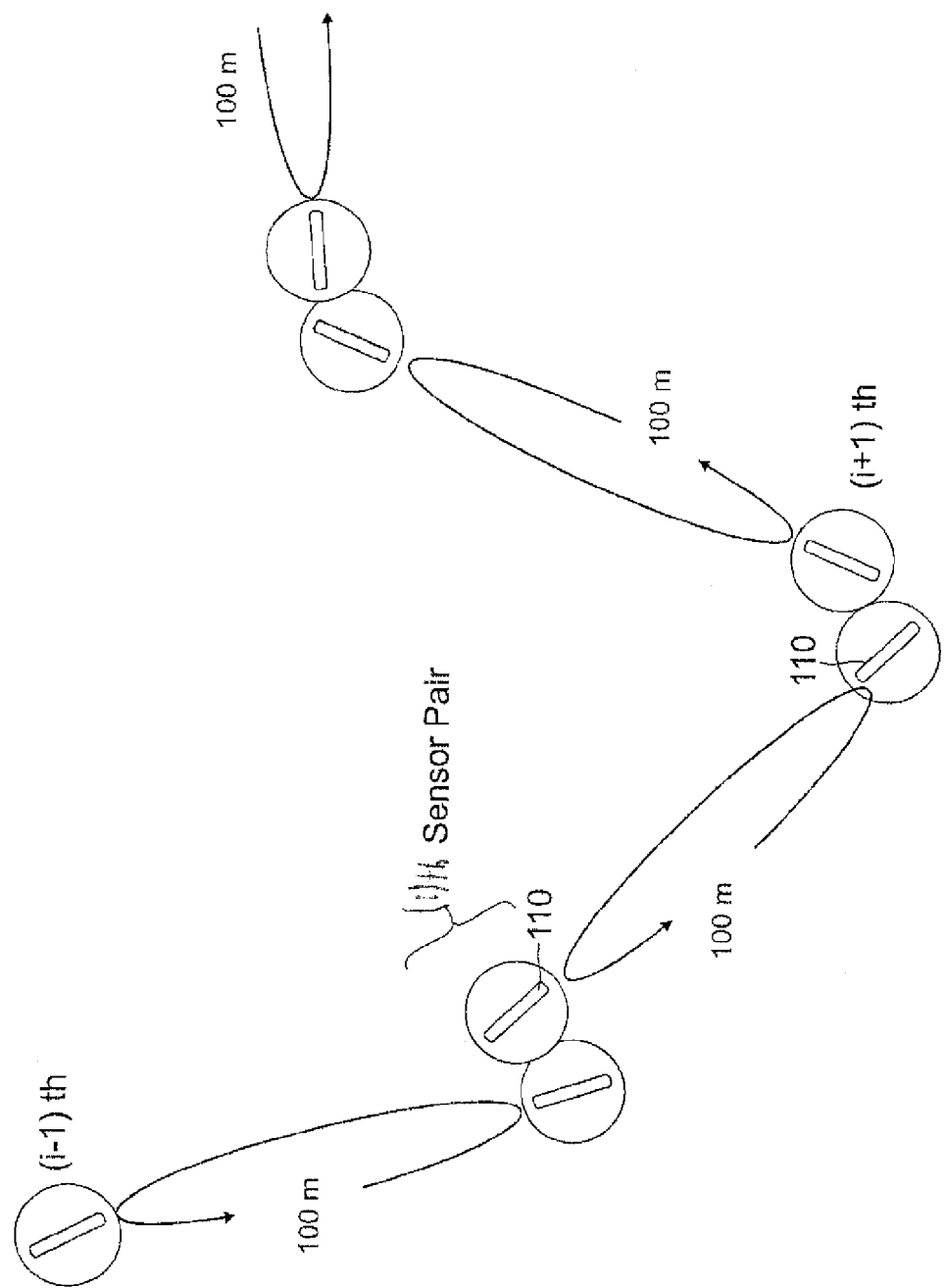
FIG. 2 is a plan view of a virtual wall formed by pairs of intrusion sensors.
Figure 3:
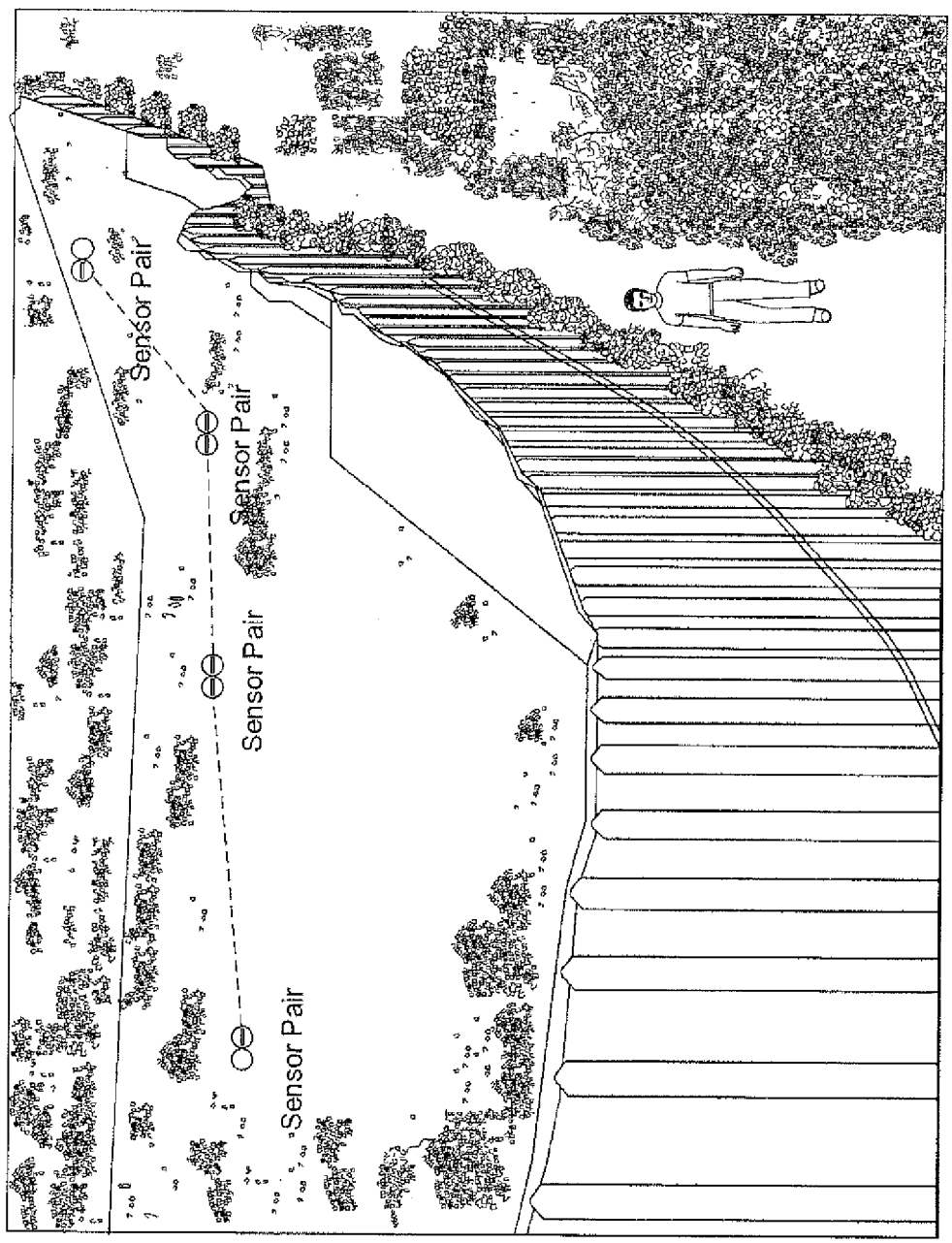
FIG. 3 is a perspective view of the virtual wall of FIG. 2.

A distributed array of transceivers provides a low-cost yet effective "electronic fence" that detects trespassers. For example, FIG. 1 shows a distributed sensor 100 that includes a base 105. The base is bottom-weighted to be stable with respect to placing on the terrain to be monitored as will be explained further with regard to FIG. 2. As seen in FIG. 2, sensors 100 are paired such that a virtual wall is formed arranged from a first sensor pair (not illustrated) through a last sensor pair (not illustrated). This arrangement may be better understood with respect to an ith pair of sensors as shown in FIG. 2. A first sensor in the ith pair has a circuit board pivoted to transmit towards a corresponding sensor in an (i−1)th sensor pair. Similarly, a second sensor in the ith pair has its circuit board 110 aligned to transmit towards a corresponding sensor in an (i+1)th sensor pair. In this fashion, each sensor pair aligns with a preceding and subsequent sensor pair (with the exception of the first and last sensor pair unless the virtual wall forms a closed ring). The sensors in any particular pair are placed adjacent to each other such that an intruder could not slip between the paired sensors to elude detection. FIG. 3 shows a perspective view of the resulting virtual wall of FIG. 2. The virtual wall may complement a physical wall or may be simply placed in unobtrusive locations in open terrain.

Referring back to FIG. 1, circuit board 110 is pivotally mounted about a pivot 150 such that its longitudinal axis is orthogonal to the ground surface underneath base 105. Board 110 includes a magnet 115 so that a magnetic field generated by a wire coil 120 in base 105 can rotate board 110 in the desired direction as controlled by a rotation control unit 145. Board 110 includes a linear array of antennas 125 such as dipole antennas or other suitable forms to form an antenna beam aligned in a boresight direction (orthogonal) to the array axis. Thus, the antenna beam propagates substantially parallel to the ground surface surrounding sensor base 105.

Board 110 is powered by a solar cell 130, which may be mounted an end of pivot 150 around which board 110 is pivotably mounted. Solar cell 130 not only powers board 110 but also charges replaceable batteries 141, which provide power to board 110 during nighttime and overcast conditions. A large variety of batteries 141 with suitable size, power and price are conventionally available. For example, occupying a volume of about 1 ×1 ×0.5 cm$^3$, a rechargeable battery with about 3.5-4Wh/cell can readily be acquired. Moreover, commercially available and relatively inexpensive solar cells offer about 0.1W/square inch of power. Thus, if solar cell 130 has an area of just 100 square inches, more than 1 W of power is available for charging batteries 141 and powering board 110.

Board 110 includes a transmit receive radio integrated circuit (IC) 140 to receive and transmit RF energy in the V band (e.g., 77 GHz) through antenna array 125. Rotation control circuit 145 controls the current driven through coil 120 to point array 125 such that its beam propagates towards a corresponding board 110 in the adjacent sensor pair. Thus, as seen in FIG. 2, circuit board 110 is actuated so that the plane defined by the circuit board points to the adjacent sensor pair's corresponding circuit board, and vice versa.

Figure 4:
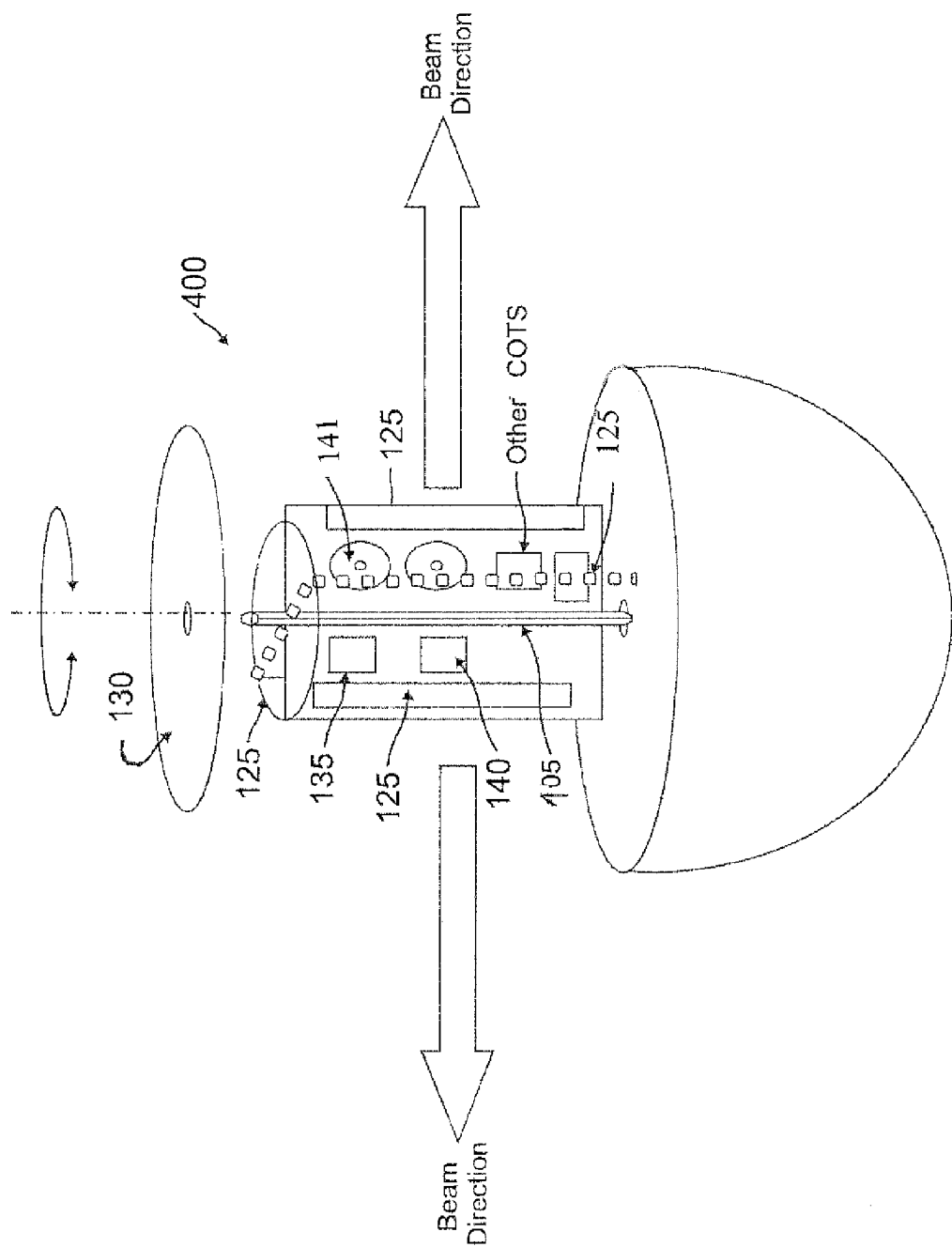
FIG. 4 is a block diagram for an alternate embodiment of the intrusion sensor.

Although distributed sensor 100 is thus inexpensive, the ability to point to just one other receiver requires the sensors to be placed in pairs as discussed with regard to FIG. 2. An alternative embodiment as shown for sensor 400 of FIG. 4 requires just one sensor 400 per link rather than a pair of sensors. Circuit board 110 is thus fixed in position with regard to a longitudinal axis 405. Board 110 includes two arrays of antennas such that two opposing beams may be generated. Since one does not know a priori the required alignment for a desired antenna beam in the resulting virtual wall, sensor 400 includes at least two other antenna arrays 125 that are shown in shadow form for illustration clarity. The supporting board for the extra antennas is also not shown but the alignment of the antennas is such that the full circumference of sensor 400 is covered. As will be explained further herein, sensor 400 differs from sensor 100 in that it cannot rotate to align an antenna but instead must include switching circuitry to select the antenna that is most aligned with an opposing sensor 400.

Regardless of whether sensor 400 or sensor 100 is used, a sensor alternates between transmitting and receiving. Sensor 100 will transmit V-band energy to only one other sensor whereas sensor 400 transmits to two other sensors. Similarly, sensor 100 will receive a V-band transmission from only one other sensor whereas sensor 400 will receive a V-band transmission from two other sensors. To keep the power costs low, the sensor spacing may be on the order of 100 meters. The resulting virtual wall of sensors thus forms a distributed bistatic radar system.

It is bistatic because a given sensor does not transmit while it is receiving a transmission from the opposing sensor and vice versa. The duration of a transmission period and a reception period is relatively arbitrary. A given sensor will first transmit during the transmission period to one opposing sensor (for sensor 100) or to two opposing sensors (for sensor 400). During the reception period, the sensor listens for transmissions from the corresponding opposing sensors. To keep the design costs low, the transmission may be simply continuous wave (un-modulated) during the transmission period. During the reception period, each sensor can thus perform envelope detection on the received continuous-wave transmission and integrate the amount of received energy to make a detection/no-detection decision regarding an intruder. The transmission period duration as well as the reception period duration is an arbitrary design parameter. For example, a one milli-second duration for each period may be implemented.

Each sensor includes a separate radio 135 (shown also in FIGS. 1 and 4) for reporting detection of an intruder. Radio 135 could be cellular such that it transmits to a base station or it could be a ZigBee or other non-cellular protocol. In a ZigBee embodiment, the radios 135 would daisy-chain to report a detection to a central command whereas in a cellular embodiment, a given sensor could directly report an intruder to the central command station through the corresponding base station.

Figure 5:
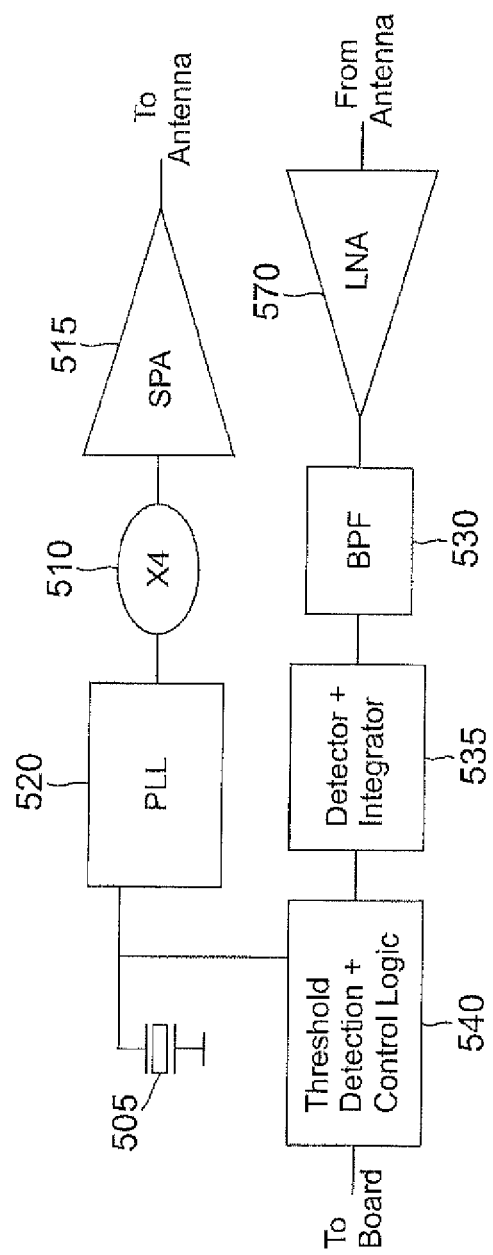
FIG. 5 is a block diagram for the transmit receive module for an intrusion sensor.

Each transmit/receive (TX/RX) module 140 may be constructed as seen in FIG. 5. A phase-locked loop (PLL) 500 generates a sinusoidal output signal operating at about 19.5 GHz based upon a crystal oscillator 505. A multiply-by-four circuit 510 upconverts the PLL output signal to drive a switched power amplifier 515. The resulting amplified V-band signal drives antennas 125 of FIG. 1. During the reception period, the received signal is amplified through a low-noise amplifier, filtered in a band-pass filter 530, and detected and integrated in a detector/integrator circuit 535. A threshold detection circuit 540 receives the integrated received signal from integrator 535 and makes an intrusion/no-intrusion decision accordingly. Should there be no detection, sensor 400 or 100 would continue transmitting and receiving to its neighboring sensor(s). Radio 135 of FIGS. 1 and 4 only needs to transmit should an intrusion detection be made, which saves on power consumption.

Should module 140 be made using conventional 130-nm SiGE-BiCMOS technology, simulation results show that power dissipation will be less than 30 mA using a supply voltage of 3V. The transmitter phase noise is approximately −60 dBc/Hz at 100 KHz. The PLL output power is about −2 dBm with a loss in the multiply-by-four circuit of around 1 dB. The power amplifier gain may be approximately 6 dB. On the receive side, the low noise amplifier noise figure is less than 8 dB with a loss in the BPF of around 1 dB. The resulting processing gain is thus higher than 20 dB assuming an integration period of between 1 ms to 100 ms.

The following analysis shows that minimum detectable radar cross section (RCS) versus distance in various embodiments. For comparison purposes, several frequencies have been analyzed under different boundary conditions as seen in the following Table 1. This table shows the minimum detectable RCS versus distance. Please note that the minimum detectable RCS calculation is equivalent to the maximum size that can disrupt the link between the two TRX linked nodes.

TABLE 1

Various transmission power scenarios

| Carrier Frequency [GHz] | Band width [GHz] | Pt [dBm] | Pin [dBm] | Antenna gain [dBi] | Additional Gain [dB] |
|---|---|---|---|---|---|
| 77 | 1 | −4 | −84 | 22 (32 × 1) | 20 (30) |
| 77 | 1 | 0 | −84 | 22 (32 × 1) | 20 (30) |
| 77 + AG + Ag | 1 | −4 | −84 | 30 (16 × 16) | 23 |
| 60 | 7 | −4 | −75 | 6 | N/A |
| 60 + AG + Ag | 7 | −4 | −75 | 30 (16 × 16) | 23 |
| 5 | 6 | −4 | −76 | 6 | N/A |
| 5 + AG + Ag | 6 | −4 | −76 | 12 | 23 |

Figure 6:
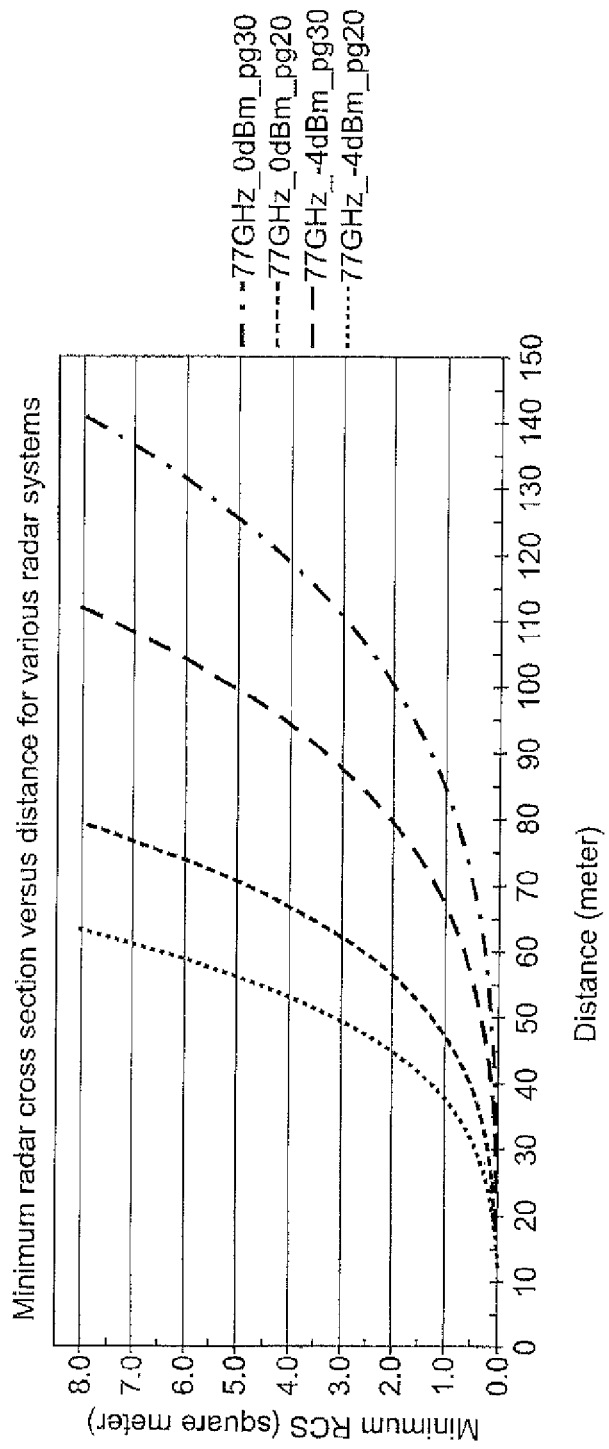
FIG. 6 is a graph of detectable radar cross sections as a function of frequency for various power levels.

To calculate input power (Pin) we have added a 6 dB margin to the noise floor set by the system band width. Using the following radar equation, radar cross section (RCS) as function of distance and signal conditions have been studied:

$$Rmax^4 = Pt*G^2*\lambda^2*S/(4\pi)^3*Pmin$$

where: Rmax is the range in which the target produces reflections that are detectable by the receiver (Rx noise floor in this case), Pt is the peak transmit power, G is the receive and transmit antenna gain, S is the radar cross section which is the target's cross section surface, and Pmin is the sensitivity of the receiver. We have assumed this number to be equal to the noise floor at the RF front-end of the receiver. For example, assuming 6 GHz of bandwidth, we will have a −76 dBm noise in the detected band, in worst case taking the receiver's NF and the loss in the antenna feed/distribution line, we assumed the sensitivity to be −70 dBm, which is the noise floor at the receiver. FIG. 6 shows the RCS as function of gain and transmitted power.

FIG. 6 shows that objects with a RCS of less than 1 square meter (10 square ft.) are detectable at 130 (2 ×65) and 170 (2 ×85) meters, respectively, with additional gains in excess of 20 dB to 30 dB when a 0 dBm output power is used. Therefore, an antenna gain obtained from spatial combining is needed to provide such a total gain. Observing the curves in FIG. 6, the alternative interpretation is that between the two TRX linked nodes of 100 (2×50) meters apart, the maximum size that can be undetected is about 10 square ft. for 0 dBm input power with additional need for antenna gain of 20 dB.

Another important issue in detecting a moving object by the sensors (sudden appearance of new reflective media in the field) is the reflected power as a result of the new reflective medium. Reflections from a human body in the millimeter wave spectrum, especially in the 60-90 GHz bands, have been studied extensively in the past few years. The human body appears to show reflection properties similar to that of a highly conductive material. A preliminary theoretical study of the reflections from a human body and other reflective media has been performed, in order to ascertain whether the resulting disturbance in received power is sufficient for an assured detection. The extinction ratio between received power at the presence and absence of an intrusive object, as well as other stationary cluttering objects was also addressed. The receiver can with high probability sense the distinction between a human target and the absence of a human target, resulting in low probability of false alarm. Our preliminary studies have shown that polarized antenna structures would offer such extinction ratios. It is important to point out that these simulations have been performed at 5 GHz and not 77 GHz. The reason for this simplification was to avoid prolonged simulation times (in excess of few weeks using a quad processor server with 16 G memory) at 77 GHz. Nevertheless, the conclusion is not expected to be different at 77 GHz from the simulation results performed at the 5 GHz. A 1×32 antenna array of dipoles or patches exhibits a gain of about 22 dBi with a 3-dB beamwidth of 3 degree at one plane and 70 degree at the other plane. The actual 1×32 array physical antenna size is about 10 mm×64 mm.

The above-described embodiments of the present invention are representative of many possible embodiments. It will thus be apparent to those skilled in the art that various changes and modifications may be made to what has been disclosed without departing from this invention. The appended claims encompass all such changes and modifications as fall within the true spirit and scope of this invention.

We claim:

1. An intrusion sensor for detecting intrusion in a bi-static radar system, comprising:
a weighted base, the base including a coil;
a pivot attached to the base; and
a circuit board mounted on the pivot; wherein the circuit board includes:
a magnet;
a rotation control circuit configured to control a rotation of the circuit board about the pivot through magnetic interaction with the magnet in response to driving a current into the coil;
an antenna array;
a transmit/receive module for alternating transmitting and receiving a V-band signal through the antenna array, the transmit/receive module being configured to integrate the received signal and to compare the integrated signal to a threshold to make an intrusion detection decision; and
a radio circuit for reporting an intrusion detection signal to a user.

2. The intrusion sensor of claim 1, wherein the antenna array is a V-band antenna array.

3. The intrusion sensor of claim 1, further comprising a solar cell configured to provide power to the intrusion sensor.

4. The intrusion sensor of claim 1, wherein the transmit/receive module is a continuous wave transmit/receive module.

* * * * *